Nov. 24, 1959 J. J. FREEMAN 2,914,269
TAPE CASE
Filed May 27, 1955
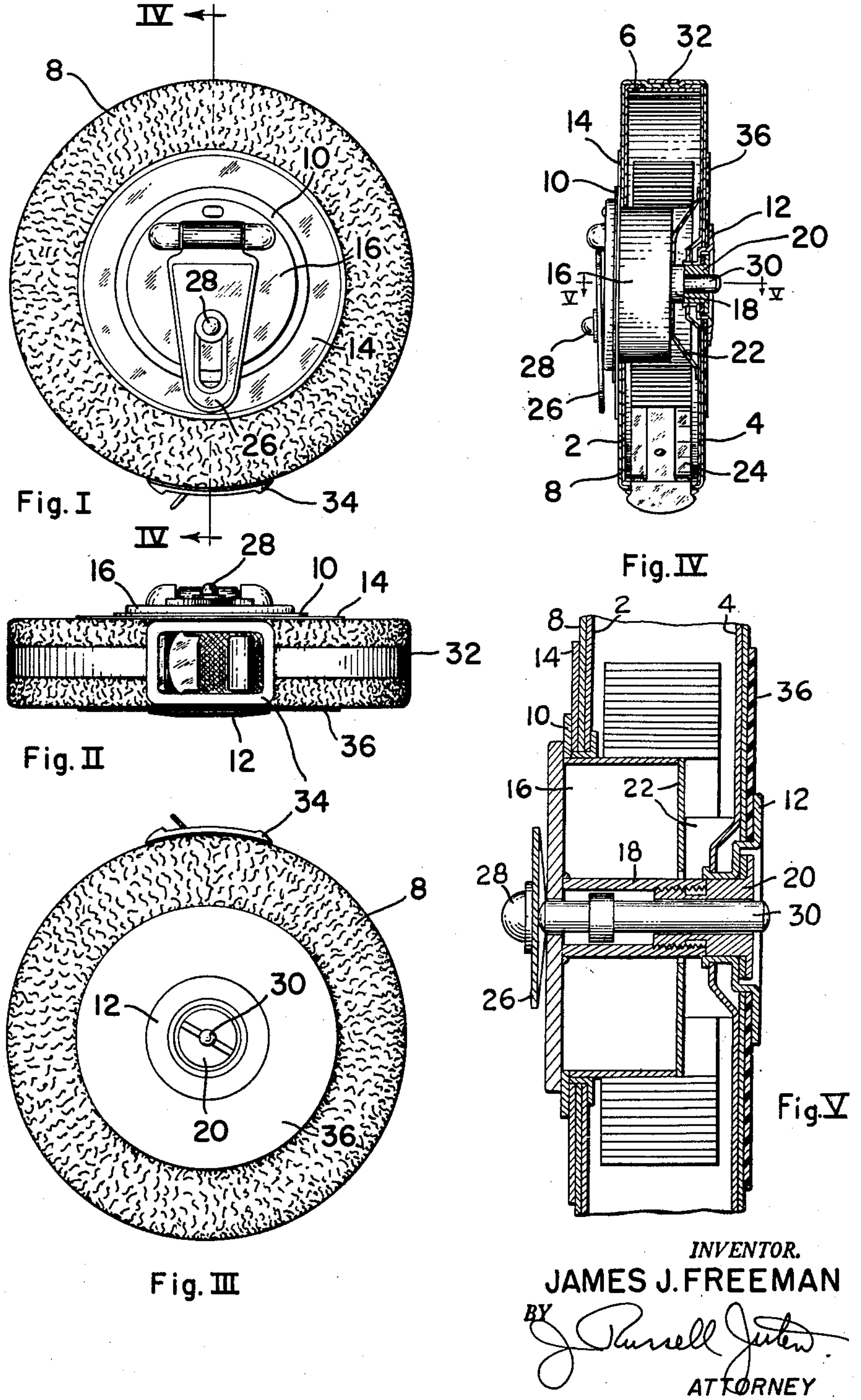
Fig. I, Fig. II, Fig. III, Fig. IV, Fig. V
INVENTOR.
JAMES J. FREEMAN
BY J. Russell Juten
ATTORNEY 2,914,269

TAPE CASE

James J. Freeman, New York, N.Y., assignor to Keuffel & Esser Company, Hoboken, N.J., a corporation of New Jersey Application May 27, 1955, Serial No. 511,610

1 Claim. (Cl. 242—84.8)

This invention relates to a case for a measuring tape having a writing disc fastened thereto.

It has been found the writing disc of this invention is very useful to the users of measuring tapes since it provides a writing surface directly on the tape case which can be used for making notations of measurements and adding and subtracting measurements. When these notations are no longer needed they can be very readily removed by simply rubbing on the disc with the thumb.

The principal objects of the invention are therefore to provide a measuring tape case with a light-colored plastic writing sheet secured thereto which can be readily written upon with an ordinary pencil to make highly legible markings which can later be readily removed without affecting the plastic material.

The invention and the means for its attainment will be more fully understood after reading the following description taken in connection with the drawing which:

Fig. I is a view in plan showing one side of the improved tape case.

Fig. II is a view in elevation showing the tape case of Fig. I.

Fig. III is a view in plan showing the other side of the tape case.

Fig. IV is a view in sectional elevation taken along the line IV—IV and looking in the direction of the arrows.

Fig. V is an enlarged fragmentary section taken on line V—V of Fig. IV with parts broken away to clearly show the rear bearing retaining flange for maintaining the plastic writing disk in position.

Referring to the drawings, it can be readily seen that most of the case is made up in conventional manner from a front shell 2 and a rear shell 4 which are held apart by a spacer 6. The front and rear shells hare covered by a leather-like plastic material 8 which is centrally secured to these shells by the front and rear bearings 10 and 12. A medallion plate 14 may also be held under the front bearing 10. The drum 16 is journalled in the front bearing 10 and is provided with a shoulder which rides against the exposed surface of the front bearing 10 which prevents the drum from slipping into the tape case. A central stud 18 extends from inside the drum 16 toward the rear bearing 12. This stud 18 may be integral with the drum 16 and is provided with an internal thread which receives the screw 20 and which passes through the rear bearing 12 and holds the drum in position in the tape case for rotation therein. The friction spring 22 acting between the drum 16 and the rear shell 4 overcomes the tendency of the measuring tape 24 to uncoil and holds it wound in the tape case.

An eye is secured to the end of the measuring tape 24 which fits around the central stud 18 securing the tape thereto. The tape passes from this eye through a slot in the drum and is wound up on the drum by rotating the drum in its bearings 10 and 12. For this purpose, the drum is provided with a handle arm 26 which is pivoted on the outside surface of the drum as shown. This arm is shown in closed position but when it is raised the knob 28 carried by this arm is exposed and may be used for rotating drum 16. The knob 28 slides in a slot in the handle arm to increase the leverage available for turning the drum 16. When the handle arm is in closed position the knob 28 fits inside the drum 16 and is held therein by a spring. A plunger 30 passes through a central opening in the stud 18 and through the screw 20. The plunger 30 is used for pushing up the handle arm 26 which makes the handle accessible.

The leather like plastic material 8 is pulled around both the front and rear shells 2 and 4 and against the spacer 6. It is then held taut by the ring 32 to form a cover for the tape case. A mouth-piece 34 is secured in the spacer 6 to form an opening through which the measuring tape passes in and out of the case.

In accord with the present invention, a light-colored plastic disc 36 is held against the leather like plastic cover 8 by the rear bearing 12. A wide variety of light colored plastic materials may be used for this disc but cellulose nitrate sheet which is pigmented white with titanium dioxide has proved to be particularly suitable. The surface properties of the plastic sheet are important. If the surface is too smooth, it will not accept the pencil lines. On the other hand, if the surface is too rough, it will not be possible to remove the markings readily. It has been found that sliced cellulose nitrate sheet has ideal surface properties for the intended purpose.

In the manufacture of cellulose nitrate sheet, it is the practice to slice the sheet from a large block of the plastic which is maintained in a softened state. The sheets which have been sliced off the block may then be laid on a sheet of fabric such as linen and allowed to harden thereon and the fabric is removed from the hardened cellulose nitrate sheet. This material is known as SL cellulose nitrate sheet and is excellently suited for the present invention. It is used with the surface exposed which was not in contact with the fabric, i.e. the sliced surface is exposed. Cellulose nitrate sheet is also available which is not hard upon a fabric backing during the curing operation. This material is known as SS cellulose nitrate sheet because it has a sliced surface on both sides and it may also be used according to the present invention. Very faint cutting marks are visible on the sliced surface in the direction of the slicing operation and these give the surface sufficient roughness so that it will accept pencil markings. When SL cellulose nitrate sheet is used, the linen surface (i.e. the surface which has the weave of the fabric embossed therein) is held against the leather like plastic covering 8.

When the plastic sheet, prepared by either of the above methods, is attached to a measuring tape case as described, it accepts pencil markings very readily and surprisingly enough these can be wiped off extremely easily by merely passing the thumb over them a few times. It is unnecessary to even use an eraser to remove the pencil markings.

Since the plastic sheet 36 is centrally supported only it should have sufficient rigidity so that it will remain flat against the side of the tape case. Cellulose nitrate sheet of .030″ thickness has been used satisfactorily and has sufficient stiffness to prevent curling away from the surface of the tape case.

Having thus described the invention, what is claimed is:

A tape case comprising an enclosure made from front and rear shells held apart by a spacer, front and rear bearing members extending through openings in the front and rear shells, rewinding mechanism adjacent the front shell including a drum mounted on said front bearing member and a tape attached to said drum and wound on said drum, said rear bearing member having a flange on the side opposite the rewinding mechanism and projecting outwardly beyond the periphery of the opening in said rear shell, a disk of relatively stiff light colored pigmented plastic on the outer surface of said rear shell and having a central opening of smaller diameter than the outside diameter of said flange for receiving the rear bearing member, said flange of said rear bearing member serving to retain the pigmented plastic disk in position in intimate contact with said rear shell, said disk being completely exposed on its outer surface beyond said flange, and said disk being of appreciably smaller diameter than said case whereby accidental contact with said disk is reduced to a minimum, said disk being substantially flat and of sufficient thickness and strength to remain substantially flat, said disk serving as a writing surface.

References Cited in the file of this patent

UNITED STATES PATENTS

| | | |
|---|---|---|
| 784,969 | Wikoff | Mar. 14, 1905 |
| 876,948 | Dexter | Jan. 21, 1908 |
| 1,056,849 | Starrett | Mar. 25, 1913 |
| 1,421,975 | Meyers | July 4, 1922 |
| 1,586,433 | Wittstein | May 25, 1926 |
| 1,839,439 | Raymond | Jan. 5, 1932 |
| 1,849,708 | Colbert et al. | Mar. 15, 1932 |
| 1,886,801 | Freiberg | Nov. 8, 1932 |
| 2,007,986 | Sprague | July 16, 1935 |
| 2,536,657 | Reese | Jan. 2, 1951 |

FOREIGN PATENTS

| | | |
|---|---|---|
| 11,962 | Great Britain | Nov. 13, 1847 |
| 926 | Great Britain | Jan. 8, 1884 |
| 10,418 | Great Britain | Sept. 3, 1885 |